US011227285B2

(12) United States Patent
Goldstone (10) Patent No.: US 11,227,285 B2
(45) Date of Patent: Jan. 18, 2022

(54) MOBILE PAYMENT SYSTEM AND METHOD (71) Applicant: Barclays Bank PLC, London (GB)

(72) Inventor: Jeremy Goldstone, Greater Manchester (GB)

(73) Assignee: Barclays Execution Services Limited, London (GB)

(*) Notice: Subject to any disclaimer, the term of this patent is extended or adjusted under 35 U.S.C. 154(b) by 641 days.

(21) Appl. No.: 15/907,855

(22) Filed: Feb. 28, 2018

(65) Prior Publication Data
US 2018/0232729 A1 Aug. 16, 2018

Related U.S. Application Data (63) Continuation of application No. 14/650,160, filed as application No. PCT/GB2013/053211 on Dec. 5, 2013, now abandoned.

(30) Foreign Application Priority Data

Dec. 5, 2012 (GB) ..................................... 1221893

(51) Int. Cl.
G06Q 20/40 (2012.01)
G06Q 20/38 (2012.01)
(Continued)

(52) U.S. Cl.
CPC ........... *G06Q 20/388* (2013.01); *G06Q 20/12* (2013.01); *G06Q 20/32* (2013.01); *G06Q 20/322* (2013.01); *G06Q 20/401* (2013.01)

(58) Field of Classification Search
CPC ........... G06Q 20/3223; G06Q 20/3276; G06Q 20/3272; G06Q 20/3274; G06Q 20/40145; G06Q 20/4097; G06Q 20/12; G06Q 20/32; G06Q 20/385; G06Q 20/425; G06Q 20/223; G06Q 20/322; G06Q 20/40; G06Q 20/401; G06Q 20/3821; G06Q 20/4014; G06Q 20/00; G06Q 20/3227; G06Q 20/02;
(Continued)

(56) References Cited

U.S. PATENT DOCUMENTS

2005/0187882 A1 8/2005 Sovio et al.
2009/0078758 A1 3/2009 Crowell
(Continued)

FOREIGN PATENT DOCUMENTS

WO WO-2011/127354 A2 10/2011
WO WO-2011/130422 A2 10/2011
WO WO-2012/151684 A1 11/2012

OTHER PUBLICATIONS

Dialog Non-Patent Literatures (NPL) Search Report, dated Sep. 10, 2021. (Year: 2021).*
(Continued)

Primary Examiner — Hai Tran
(74) Attorney, Agent, or Firm — Foley & Lardner LLP (57) ABSTRACT A merchant website automatically detects whether a customer device has a registered payment application; if so, the website generates a custom protocol message that is triggered on checkout to initiate payment via the payment application. Details of the transaction are passed to the payment application via a payment server so that the user can authorize the transaction within the payment application.

24 Claims, 4 Drawing Sheets (51) Int. Cl.
*G06Q 20/32* (2012.01)
*G06Q 20/12* (2012.01)

(58) Field of Classification Search
CPC .... G06Q 20/10; G06Q 20/3255; G06Q 20/34; G06Q 20/405; G06Q 20/388; G06Q 10/087; G06Q 20/108; G06Q 20/3226; G06Q 40/02
USPC .......................................................... 705/44
See application file for complete search history.

(56) References Cited

U.S. PATENT DOCUMENTS

| | | | |
|---|---|---|---|
| 2010/0299225 A1 | 11/2010 | Aarni et al. | |
| 2011/0251892 A1* | 10/2011 | Laracey | G06Q 30/0253 705/14.51 |
| 2012/0191569 A1 | 7/2012 | Shah | |
| 2012/0316992 A1* | 12/2012 | Oborne | G06Q 20/386 705/26.41 |
| 2013/0144776 A1* | 6/2013 | Webster | G06Q 40/025 705/38 |
| 2013/0238455 A1* | 9/2013 | Laracey | G06Q 20/108 705/21 |
| 2014/0067581 A1* | 3/2014 | Yamahara | G06Q 30/0601 705/26.1 |
| 2014/0149293 A1* | 5/2014 | Laracey | G06Q 20/108 705/44 |
| 2014/0222596 A1 | 8/2014 | S | |

OTHER PUBLICATIONS

International Preliminary Report on Patentability in International Application No. PCT/GB2013/053211 dated Jun. 9, 2015 (6 pages).
International Search Report and Written Opinion in International Application No. PCT/GB2013/053211 dated Mar. 19, 2014 (9 pages).
Non-Final Rejection in U.S. Appl. No. 14/650,160 dated Sep. 20, 2017 (12 pages).

* cited by examiner

MOBILE PAYMENT SYSTEM AND METHOD

FIELD OF THE INVENTION

This invention relates to a system and method for online payment using a payment application.

BACKGROUND OF THE INVENTION

Conventional methods of online payment include an online checkout model, where a customer orders a 'basket' of goods or services on a merchant website, and selects a 'checkout' option to order and pay for the contents of the basket. Payment may be effected by entering details of a payment card, including card number, card holder name, card expiry data, CVC code and billing address. Some of these details may be pre-stored to save the customer from entering them every time, but this raises security issues.

In an alternative 'hosted checkout' model, payment is handled by a third party payment service such as PayPal® or Google Checkout®. A checkout page of the merchant website includes one or more 'pay buttons' which launch the payment service; the customer logs on to the payment service, and if the payment is authorised, a confirmation is sent to the merchant to complete the transaction.

SUMMARY OF THE INVENTION

Different aspects of the present invention are defined in claims 1, 18, 19 and 20.

In an embodiment of the invention, an online merchant automatically detects whether a customer device has a registered payment application; if so, the web site generates a custom protocol message that is triggered on checkout to initiate payment via the payment application. Details of the transaction are passed to the payment application so that the user can authorise the transaction within the payment application. In order to securely pass these details to the payment application, the merchant passes a payment request token and transaction details to a payment server that processes payments for the payment application. The payment request token is also passed in the custom protocol message to the payment application, which uses the payment request token to obtain the transaction details from the payment server. The transaction details are then presented to the user when requesting authorisation of the transaction by the payment application. In this way, the transaction details can be passed securely to the payment application. Tampering with the payment amount and transaction details, for example via 'Man in the Middle' or malicious users can thereby be avoided.

After the user authorises the transaction, the payment application indicates the outcome of the authorisation request to the payment server, which returns a corresponding outcome token to the payment application; the outcome token is passed to the merchant server by the payment application so that the authorisation outcome is securely communicated to the merchant, who may then process the transaction based on the outcome.

The online merchant may apply time restrictions to authorisation of a transaction; for example, a basket may time out if a time period is exceeded, in order to conserve resources. If the time restrictions are exceeded, then the transaction details may be recovered from the payment server and used to restore the transaction with the online merchant. The online merchant may amend the transaction details, for example by checking price or availability, before processing the transaction.

There may be provided a device, a merchant server, a payment server and associated computer programs arranged to carry out the above method.

BRIEF DESCRIPTION OF THE DRAWINGS

There now follows, by way of example only, a detailed description of embodiments of the present invention, with reference to the figures identified below.

DETAILED DESCRIPTION OF EMBODIMENTS OF THE INVENTION

Technical Architecture

Figure 1:
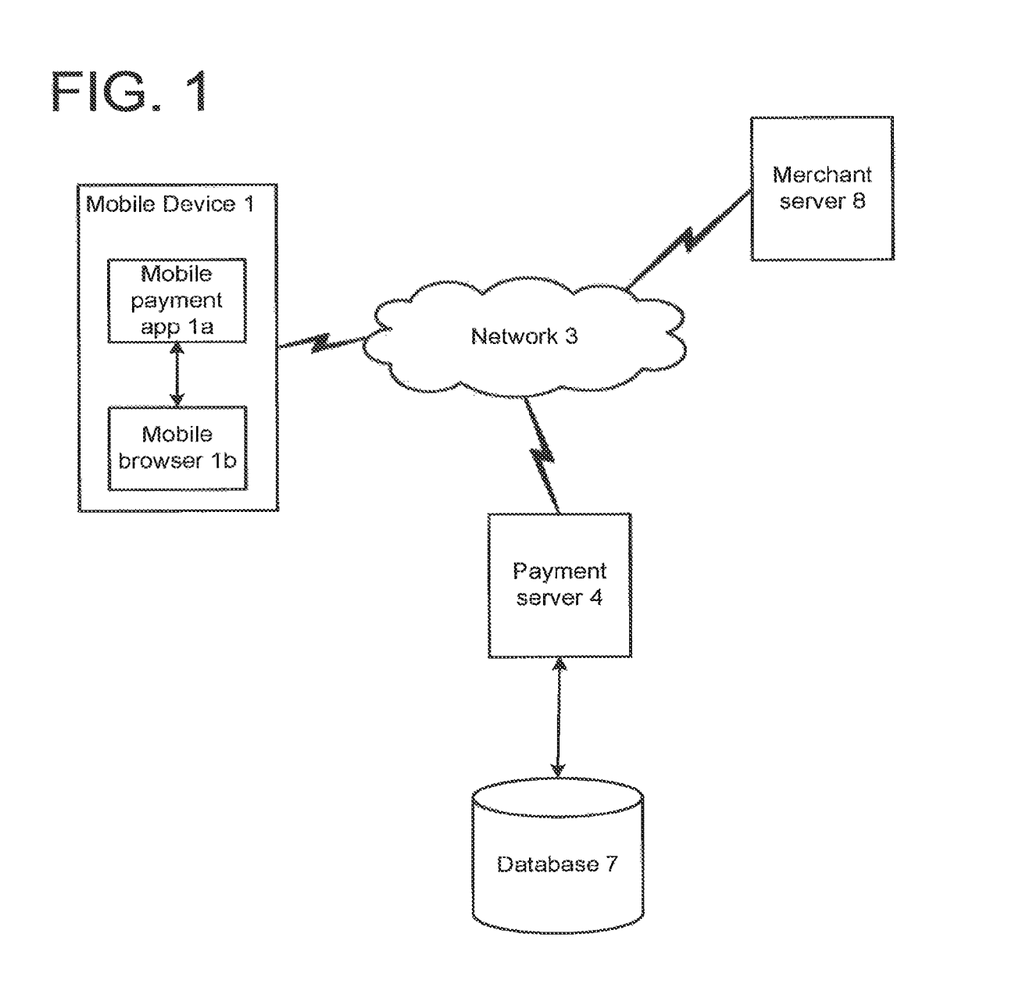
FIG. 1 is a diagram of the main components of a mobile payment system according to embodiments of the invention.

Referring to FIG. 1, a mobile payment system according to embodiments of the invention comprises a wireless or mobile communication device 1 having a payment application 1a, connected or connectable to a payment server 4 over a network 3. The payment server 4 interacts with the payment application 1a to authorise and process payments by interaction with an authenticated user of the payment application 1a. The payment server 4 has access to one or more database(s) 7 including registration data relating to the payment application 1a and transaction data relating to specific payment sessions.

The payment server 4 may be connected to, or may comprise a payment fulfillment service of a type that is known per se. The payment fulfillment service executes requested payments between specified accounts.

The device 1 may also have a mobile browser application 1b, or a dedicated application, for accessing and interacting with an online store hosted by a merchant server 8 connected to the network 3. The online store displays items that a customer may select for purchase, and stores the selected item(s) selected by the customer during a session in a 'basket' or other model representing a set of items selected for purchase. The merchant server 8 may comprise multiple components, such as a web server for serving web pages to a customer's browser and a back-end server for storing data representing customers and baskets, and interfacing with payment systems. The device 1 may be a client of the merchant server 8, although embodiments of the invention may not be limited to a client-server model.

The device 1 may be of a type that is known per se, such as an iOS™, Blackberry™ or Android™ based smartphone, a 'feature' phone, a personal digital assistant (PDA), a tablet computer, or any processor-powered device with suitable input and display means. In some embodiments, the device 1 need not have a voice telephony function. The device 1 may be a terminal of the network 3.

The network 3 may comprise a terrestrial cellular network such as a 2G, 3G or 4G network, a private or public wireless network such as a WiFi™-based network and/or a mobile satellite network or the Internet. It will be appreciated that a plurality of, and preferably a large number of devices 1 and merchant servers 8 are operable concurrently within the system.

Introduction

Figure 2:
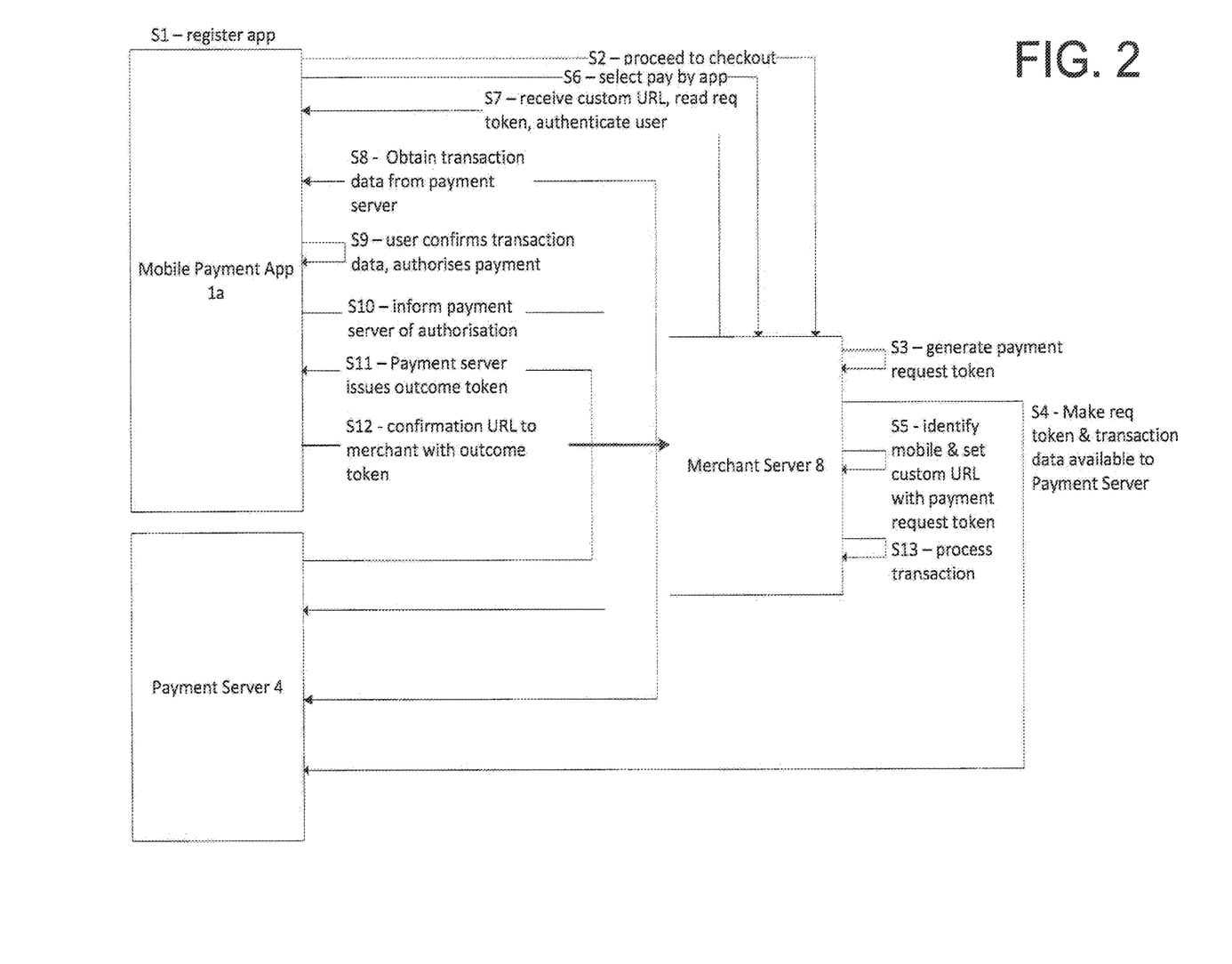
FIG. 2 is a flow diagram illustrating method steps in an embodiment of the invention.

An online payment process in an embodiment of the present invention will now be described with reference to the steps S1 to S12 shown in FIG. 2. Step S1 comprises an initial setup and registration process, while steps S2 to S12 comprise a specific payment session, and may be repeated in subsequent payment sessions.

Registration

S1—the user installs the payment application 1*a* on the device 1. As part of this process, the application 1*a* is associated with a custom protocol handler; this may take the form of a URL (Uniform Resource Locator) beginning 'bpay://', for example. The payment application 1*a* is also registered with the payment server 4, by providing verified account information and by setting up a secure communications protocol between the application 1*a* and the payment server 4, for example by setting up one or more cryptographic keys associated with a passcode associated with a registered user. The key(s) may be generated from the passcode as entered by the user during setup. The passcode may be a PIN, graphical passcode and/or biometric data such as a fingerprint or iris scan. The passcode may be modified by the user after setup.

In the specific embodiments described below, a user is required to enter the passcode as part of an authentication process. The passcode may be entered as a numeric or alphanumeric input, a graphical input such as a signature or gesture, or a biometric input. Preferably, the passcode is validated remotely, for example by generating a cryptographic key from the passcode, which key is used to sign a message sent to the payment server 4 and/or a challenge sent by the payment server 4. The payment server 4 may only respond as described in the embodiments below if the resulting signature is validated. If not, the payment server 4 may prompt the application 1*a* to request the passcode again. The payment server 4 may block access by the application 1*a* if it presents an invalid signature more than a predetermined number of times. In this way, the authentication process is made resistant to 'brute force' attacks.

Alternatively the entered passcode may be validated locally against a passcode stored in a local secure area of the device 1. If the passcode is validated, then the mobile application 1*a* is enabled to operate, for example as described in the specific embodiments below. This enablement may include access to locally stored cryptographic key(s) for secure communication with the payment server 4.

Payment Process

S2—the user browses an online store, for example on a website using the mobile browser 1*b* or other application. The user selects one or more items which are added to a 'basket' or any other model representing a set of items selected for purchase. The user, wishing to complete the purchase, then selects a 'checkout' option on the website.

S3—The merchant server 8 detects that the user is accessing the online store using a device having the payment application 1*a* registered thereon. Preferably, this detection is performed automatically, without the need for user intervention such as the user interacting with the payment application 1*a* on the mobile device 1. Detection may be done when the reaching the checkout stage, or at an earlier stage of the session. The detection may be performed by any of the following methods:

The mobile browser 1*b* is integrated with the payment application 1*a*, for example by wrapping, monitoring or via a plug-in, so that the payment application 1*a* passes identifying information to the merchant server 8 during the ordering process, for example by injecting HTTP headers, data fields or cookies into the browser.

The merchant server 8 runs a 'beacon' script or request (e.g. bpay://beaconRequest) that attempts to access the payment application 1*a* in the background; if the payment application 1*a* responds to the beacon request, the merchant server 8 detects that the payment application 1*a* is present.

The merchant server 8 sets up a call back for the payment application 1*a*.

The merchant server 8 may trigger a standardised request to the mobile device 1 to use a cloud service or commonly installed application (e.g. Facebook™) to return an attribute that indicates the user has the payment application 1*a* installed. The standardised request and attribute return is authorised by the user e.g. via an secure authorisation protocol such as OAuth.

Alternatively, the user may select an option presented by the online store to pay via the payment application 1*a*.

If the payment application 1*a* is detected, then the merchant server 8 generates a payment request token identifying the merchant and the basket, and including a return address, for example a URL to a merchant service.

S4—the merchant server 8 makes the payment request token available to the payment server 4, either by a 'push' model in which the token is sent to the payment server 4, or a 'pull' model in which the payment server 4 reads the token from the merchant server 8. The merchant server 8 also makes transaction data available to the payment server, including for example the total amount to be paid, information on specific items within the basket such as name and individual cost, and/or any specific conditions associated with the purchase. Alternatively, the transaction data may be included within the payment request token, in which case the transaction data should be protected from tampering by suitable cryptographic means, for example by encryption, a digital signature or a hash-based authentication code (HMAC).

S5—the merchant server 8 creates a custom protocol message to pass the payment request token to the payment application 1*a* identified in step S3. For example, a custom URL or URI (Uniform Resource Identifier) may be created beginning with the custom protocol handler and including the payment request token (e.g. bPay://PaymentToken). The merchant server 8 presents to the device 1, at the checkout stage, an option to pay using the payment application 1*a*, for example by displaying a pay button that triggers the custom URL.

S6—the user wishing to pay using the mobile application 1*a* selects that option from the merchant web site, for example by clicking the pay button.

S7—In response to the selection at step S6, the device 1 receives the custom protocol message, including the payment request token. The device 1 identifies the payment application 1*a* as being associated with the custom protocol handler and therefore passes the custom protocol message to the payment application 1*a*. The payment application 1*a* may be launched automatically by the device 1, if not already open. The user may be authenticated by the payment application 1*a*, for example by entering a passcode as described above, if this has not already been done.

S8—the payment application 1*a* retrieves the transaction data for the relevant session from the payment server 4, using the payment request token as a reference. The payment server 4 may already have received the transaction data at step S4, or may obtain the transaction data from the merchant server 8 at this point, for example using a merchant identifier within the payment request token, together with relevant configuration information to allow the payment server 4 to contact the correct merchant server 8.

S9—The payment application 1*a* displays or otherwise communicates at least some of the transaction data to the user and requests the user to authorise the purchase of the items in the basket. The user may simply choose between 'accept' or 'decline' options, or may additionally select a mode of payment, such as payment from a specific bank account registered with the payment application 1*a*, and/or a wallet account associated with the payment application 1*a*.

S10—the payment application 1*a* informs the payment server 4 of the outcome of the purchase authorisation request. If the request is authorised, the payment server 4 may initiate payment from the designated user account to the merchant.

S11—In response to the outcome information, the payment server 4 issues a payment outcome token to the payment application 1*a*. The payment outcome token may for example contain a unique transaction reference and integrity code, or may simply be a random or one-time code that references transaction information accessible on the payment server 4.

S12—the payment application 1*a* passes the payment outcome token to the merchant server 8, for example by generating and launching a confirmation URL to the merchant server 8, including the return address and the payment confirmation token. The merchant server 8 may obtain transaction details from the payment server 4 using the payment confirmation token, which may be a SAML token, a custom token with suitable cryptographic controls, or a large random number similar to the SAML artefact model. Where a SAML or other signed token is used, the merchant server 8 does not need to contact the payment server 4 once the token is validated.

S13—the merchant server 8 processes the transaction in accordance with the outcome indicated by the payment outcome token: if the purchase is authorised, the transaction may be completed by processing the order for the items in the basket; if the purchase is declined, the transaction is cancelled. Alternatively, the merchant server 8 may query the payment server 4 with the original payment request token to find out the outcome, for example if the payment outcome token does not arrive at the merchant server 8.

As an optional additional step, the merchant server 8 may be required to present the payment outcome token to the payment server 4 in order to confirm that the transaction has been completed, and payment to the merchant may be suspended until this additional step is completed.

In an alternative embodiment, after the payment server 4 has received the transaction data from the merchant server 8 at step S4, the payment server 4 may interact directly with the payment application 1*a*, for example via a push message, to obtain authorisation for the transaction. The payment server 4 then sends the payment outcome token to the merchant server 8, which processes the transaction in accordance with the indicated outcome.

Basket Recovery Process

The above description assumes that the payment process is not interrupted. However, in the event of a break-down or potential failure in one or more of the steps, one or more additional recovery processes may be invoked, examples of which are described below.

The online store hosted by the merchant server 8 may require checkout to be completed within a specified period of time or by a specified cut-off time, for example to conserve resources or to release reserved items for purchase by other customers. If a time-out condition occurs between step S6 and step S12, the recovery process may be one of the following:

The transaction data obtained by the payment server 4 at step S4, or subsequently, may be returned to the merchant server 8 so that the transaction can be restored.

The merchant server 8 checks current availability and/or price of the items in the basket and may modify the transaction data if availability or price have changed.

If one or more of the items in the basket are no longer available, the merchant server 8 may amend the basket, for example by removing the unavailable item(s), offering alternatives to the unavailable item(s) or applying a reduced price; payment for the amended basket may then be processed, for example by repeating steps S7 to S13.

The merchant server 8 may process the transaction and issue a refund for any unavailable items, for example by further communication with the payment server 4 and/or the payment application 1*a*.

The merchant server 8 may cancel the transaction.

Alternative Embodiments and Applications

The above embodiments are described by way of example, and alternative embodiments which may become apparent to the skilled person on reading the above description may nevertheless fall within the scope of the claims.

Device Details

Figure 3:
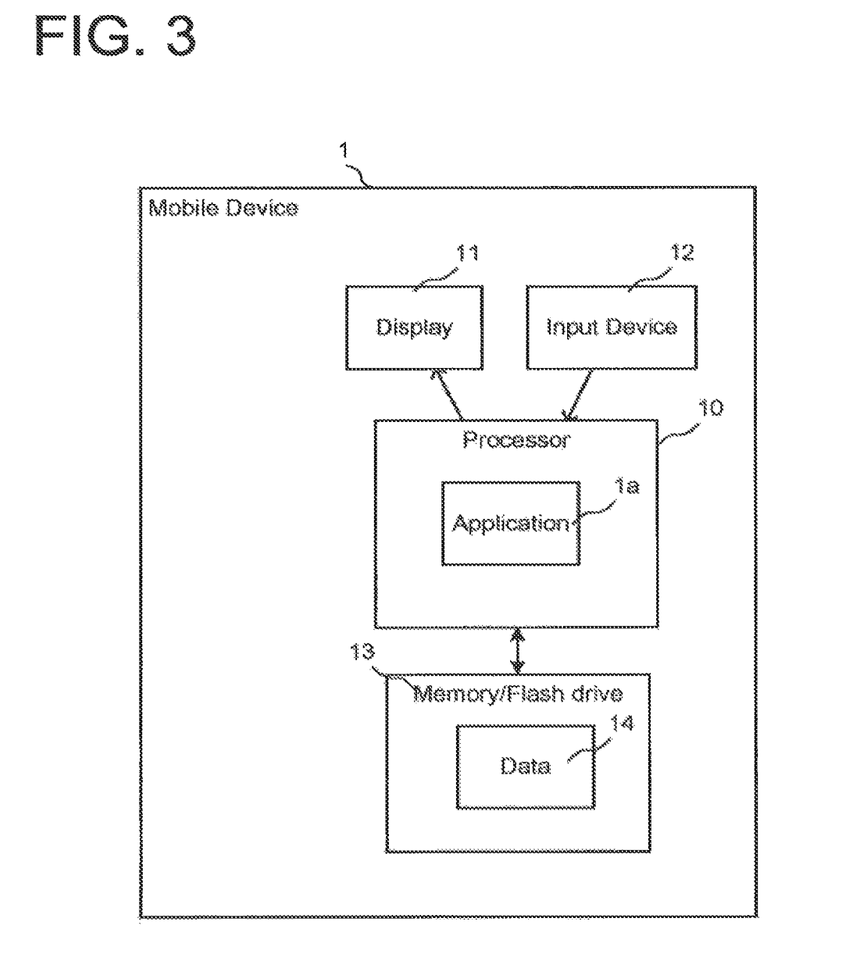
FIG. 3 is a diagram of a mobile device for use in embodiments of the invention.

FIG. 3 shows further details of one example of the device 1 comprising at least a processor 10, including for example hardware and an application platform, running the payment application 1*a*, and connected to memory or other form of data storage facility such as flash drive 13 storing local data 14. The application platform may be a mobile operating system such as IOS™, Android™, Blackberry OS, Windows-based OS, or other embedded OS such as Open Embedded Build system, Symbian OS, Contiki, FreeBSD, and TinyOS. The application 1*a* may comprise program code, which can be loaded or downloaded onto the device 1.

The device 1 has a display 11 and a manual input device 12, which may be integrated with the display as a touchscreen, and/or provided as a keypad. An alternative or additional input device may be used, such as a trackball, trackpad, motion sensor or mouse.

The device 1 includes a network interface 15 to the network 3.

Computer Details

Figure 4:
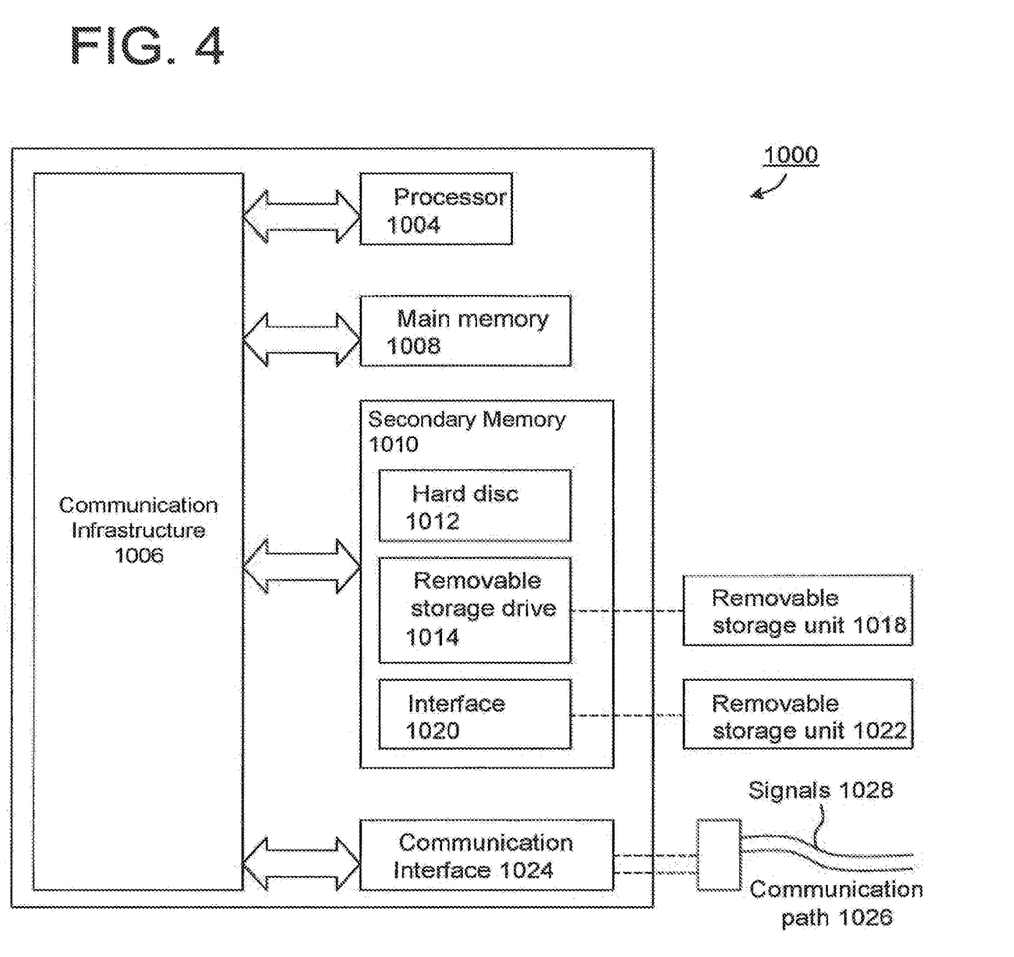
FIG. 4 is a diagram showing details of a computer system for use in embodiments of the invention.

The merchant server 4 and/or the payment server 7 may be implemented by computer systems such as computer system 1000 as shown in FIG. 4. Embodiments of the present invention may be implemented as programmable code for execution by such computer systems 1000. After reading this description, it will become apparent to a person skilled in the art how to implement the invention using other computer systems and/or computer architectures.

Computer system 1000 includes one or more processors, such as processor 1004. Processor 1004 may be any type of processor, including but not limited to a special purpose or a general-purpose digital signal processor. Processor 1004 is connected to a communication infrastructure 1006 (for example, a bus or network). Various software implementations are described in terms of this exemplary computer system. After reading this description, it will become apparent to a person skilled in the art how to implement the invention using other computer systems and/or computer architectures.

Computer system 1000 also includes a main memory 1008, preferably random access memory (RAM), and may also include a secondary memory 610. Secondary memory 1010 may include, for example, a hard disk drive 1012 and/or a removable storage drive 1014, representing a floppy disk drive, a magnetic tape drive, an optical disk drive, etc. Removable storage drive 1014 reads from and/or writes to a removable storage unit 1018 in a well-known manner. Removable storage unit 1018 represents a floppy disk, magnetic tape, optical disk, etc., which is read by and written to by removable storage drive 1014. As will be appreciated, removable storage unit 618 includes a computer usable storage medium having stored therein computer software and/or data.

In alternative implementations, secondary memory 1010 may include other similar means for allowing computer programs or other instructions to be loaded into computer system 1000. Such means may include, for example, a removable storage unit 1022 and an interface 1020. Examples of such means may include a removable memory chip (such as an EPROM, or PROM, or flash memory) and associated socket, and other removable storage units 1022 and interfaces 1020 which allow software and data to be transferred from removable storage unit 1022 to computer system 1000. Alternatively, the program may be executed and/or the data accessed from the removable storage unit 1022, using the processor 1004 of the computer system 1000.

Computer system 1000 may also include a communication interface 1024. Communication interface 1024 allows software and data to be transferred between computer system 1000 and external devices. Examples of communication interface 1024 may include a modem, a network interface (such as an Ethernet card), a communication port, a Personal Computer Memory Card International Association (PCM-CIA) slot and card, etc. Software and data transferred via communication interface 1024 are in the form of signals 1028, which may be electronic, electromagnetic, optical, or other signals capable of being received by communication interface 1024. These signals 1028 are provided to communication interface 1024 via a communication path 1026. Communication path 1026 carries signals 1028 and may be implemented using wire or cable, fibre optics, a phone line, a wireless link, a cellular phone link, a radio frequency link, or any other suitable communication channel. For instance, communication path 1026 may be implemented using a combination of channels.

The terms "computer program medium" and "computer usable medium" are used generally to refer to media such as removable storage drive 1014, a hard disk installed in hard disk drive 1012, and signals 1028. These computer program products are means for providing software to computer system 1000. However, these terms may also include signals (such as electrical, optical or electromagnetic signals) that embody the computer program disclosed herein.

Computer programs (also called computer control logic) are stored in main memory 1008 and/or secondary memory 1010. Computer programs may also be received via communication interface 1024. Such computer programs, when executed, enable computer system 1000 to implement embodiments of the present invention as discussed herein. Accordingly, such computer programs represent controllers of computer system 1000. Where the embodiment is implemented using software, the software may be stored in a computer program product and loaded into computer system 1000 using removable storage drive 1014, hard disk drive 1012, or communication interface 1024, to provide some examples.

Alternative embodiments may be implemented as control logic in hardware, firmware, or software or any combination thereof.

The invention claimed is:

1. A method of authorizing a transaction with a merchant server using a mobile communication device, the method comprising:
    initiating, by one or more processors of a merchant server and via a first application stored in memory of a mobile communication device, a transaction between the mobile communication device and the one or more processors of the merchant server;
    providing, by the one or more processors of the merchant server to a payment server, a request token and transaction data relating to the transaction;
    detecting, by the one or more processors of the merchant server, whether a payment application is stored in the memory of the mobile communication device; and
    if the one or more processors of the merchant server detect that the payment application is stored in the memory of the mobile communication device, providing, by the one or more processors of the merchant server, the request token to the first application of the mobile communication device, such that the first application passes the request token to the payment application, wherein the payment application:
        obtains the transaction data from the payment server using the request token;
        obtains user authorization of the transaction, including communicating at least some of the transaction data to a user;
        transmits an indication of the user authorization to the payment server;
        receives an outcome token from the payment server; and
        authorizes the transaction by transmitting the outcome token to the one or more processors of the merchant server.

2. The method of claim 1, wherein detecting whether a payment application is stored in the memory of the mobile communication device is performed automatically, without user intervention.

3. The method of claim 1, wherein the request token is provided to the mobile communication device using a custom protocol arranged for handling by the payment application.

4. The method of claim 1, including setting a time criterion for authorization of the transaction at the one or more processors of the merchant server, and initiating a recovery procedure if the time criterion is not met.

5. The method of claim 4, wherein the recovery procedure comprises amending the transaction data and authorizing the transaction with the amended transaction data.

6. The method of claim 4, wherein the recovery procedure comprises authorizing the original transaction, determining any changes in the transaction data, and issuing a refund to the user in respect of the changes.

7. The method of claim 4, wherein the recovery procedure comprises cancelling the transaction.

8. The method of claim 1, wherein the transaction comprises a purchase of one or more items from an online store, and the transaction data provides details of the one or more items.

9. The method of claim 5, wherein the transaction comprises a purchase of one or more items from an online store, and the transaction data provides details of the one or more items.

10. The method of claim 6, wherein the transaction comprises a purchase of one or more items from an online store, and the transaction data provides details of the one or more items.

11. The method of claim 9, wherein the recovery procedure comprises determining any changes to the one or more items, and amending the transaction data accordingly.

12. The method of claim 10, wherein the recovery procedure comprises determining any changes to the one or more items, and issuing the refund in respect of the changes.

13. The method of claim 8, wherein the one or more items are represented by a basket, and the transaction is initiated by checking out the basket.

14. The method of claim 1, wherein the user is authenticated by the payment application before or during authorization of the transaction.

15. The method of claim 1, wherein the merchant server comprises a web server.

16. The method of claim 3, wherein the merchant server comprises a web server.

17. The method of claim 15, wherein the first application comprises a mobile browser for accessing the web server.

18. The method of claim 16, wherein the first application comprises a mobile browser for accessing the web server.

19. The method of claim 18, wherein the custom protocol comprises a custom URI.

20. The method of claim 17, wherein the step of providing the request token from the one or more processors of the merchant server to the mobile communication device includes providing a link for selection by the user.

21. A method of operating a mobile communication device in communication with a merchant server and a payment server, the method comprising:
    initiating, via a first application stored in memory of a mobile communication device, a transaction between the mobile communication device and one or more processors of the merchant server,
        wherein the one or more processors of the merchant server detect whether the payment application is stored in the memory of the mobile communication device;
    if the one or more processors of the merchant server detect that a payment application is stored in the memory of the mobile communication device, receiving, via the first application, a request token from the one or more processors of the merchant server and passing the request token to the payment application;
    obtaining transaction data from the payment server using the request token;
    obtaining user authorization of the transaction, including communicating at least some of the transaction data to the user;
    transmitting an indication of the user authorization to a payment server;
    receiving an outcome token from the payment server; and
    authorizing the transaction by transmitting the outcome token to the one or more processors of the merchant server.

22. A non-transitory computer-readable storage medium storing executable instructions that, when executed by one or more processors of a merchant server, cause the one or more processors of the merchant server to:
    initiate, via a first application stored in memory of a mobile communication device, a transaction between the mobile communication device and the one or more processors of the merchant server;
    provide, to a payment server, a request token and transaction data relating to the transaction;
    detect whether a payment application is stored in the memory of the mobile communication device; and
    if the one or more processors of the merchant server detect that the payment application is stored in the memory of the mobile communication device, provide the request token to the first application of the mobile communication device, such that the first application passes the request token to the payment application,
        wherein the payment application:
            obtains the transaction data from the payment server using the request token;
            obtains user authorization of the transaction, including communicating at least some of the transaction data to a user;
            transmits an indication of the user authorization to the payment server;
            receives an outcome token from the payment server; and
            authorizes the transaction by transmitting the outcome token to the one or more processors of the merchant server.

23. A non-transitory computer-readable storage medium storing executable instructions that, when executed by first one or more processors of a mobile communication device, cause the first one or more processors of the mobile communication device to:
    initiate, via a first application stored in memory of the mobile communication device, a transaction between the mobile communication device and second one or more processors of a merchant server,
        wherein the second one or more processors of the merchant server detect whether the payment application is stored in the memory of the mobile communication device;
    if the second one or more processors of the merchant server detect that a payment application is stored in the memory of the mobile communication device, receive, via the first application, a request token from the second one or more processors of the merchant server and pass the request token to the payment application;
    obtain transaction data from a payment server using the request token;
    obtain user authorization of the transaction, including communicating at least some of the transaction data to the user;
    transmit an indication of the user authorization to a payment server;
    receive an outcome token from the payment server; and
    authorize the transaction by transmitting the outcome token to the second one or more processors of the merchant server.

24. A system comprising:
    one or more processors of a merchant server in communication with a mobile communications device and a payment server, the one or more processors of the merchant server having programmed instructions that, upon execution, cause the one or more processors of the merchant server to:
    initiate, via a first application stored in memory of a mobile communication device, a transaction between the mobile communication device and the one or more processors of the merchant server;

provide, to a payment server, a request token and transaction data relating to the transaction;

detect whether a payment application is stored in the memory of the mobile communication device; and if the one or more processors of the merchant server detect that the payment application is stored in the memory of the mobile communication device, provide the request token to the first application of the mobile communication device, such that the first application passes the request token to the payment application, wherein the payment application:
- obtains the transaction data from the payment server using the request token;
- obtains user authorization of the transaction, including communicating at least some of the transaction data to a user;
- transmits an indication of the user authorization to the payment server;
- receives an outcome token from the payment server; and
- authorizes the transaction by transmitting the outcome token to the one or more processors of the merchant server.

* * * * *